US012666503B2

(12) United States Patent
Ishikawa et al.

(10) Patent No.: US 12,666,503 B2
(45) Date of Patent: Jun. 23, 2026

(54) CERAMIC HEATER

(71) Applicant: NGK Insulators, Ltd., Nagoya-City (JP)

(72) Inventors: Masaki Ishikawa, Handa-City (JP); Hiroya Sugimoto, Chiryu-City (JP)

(73) Assignee: NGK INSULATORS, LTD., Nagoya (JP)

(*) Notice: Subject to any disclaimer, the term of this patent is extended or adjusted under 35 U.S.C. 154(b) by 713 days.

(21) Appl. No.: 18/157,191

(22) Filed: Jan. 20, 2023

(65) Prior Publication Data

US 2023/0284341 A1 Sep. 7, 2023

(30) Foreign Application Priority Data

Mar. 3, 2022 (JP) ................................ 2022-032565

(51) Int. Cl.
*H05B 3/14* (2006.01)
*H05B 3/00* (2006.01)
(Continued)

(52) U.S. Cl.
CPC ........... *H05B 3/143* (2013.01); *H05B 3/0019* (2013.01); *H05B 3/265* (2013.01); *H05B 3/283* (2013.01); *H05B 2203/005* (2013.01)

(58) Field of Classification Search
CPC .......... H05B 3/06; H05B 3/141; H05B 3/143; H05B 3/265; H05B 3/283; H05B 3/286;
(Continued)

(56) References Cited

U.S. PATENT DOCUMENTS

| | | | | |
|---|---|---|---|---|
| 6,960,743 B2 * | 11/2005 | Hiramatsu | ........ | H01L 21/68785 219/444.1 |
| 7,279,661 B2 * | 10/2007 | Okajima | .................. | H05B 3/68 219/544 |

(Continued)

FOREIGN PATENT DOCUMENTS

| | | |
|---|---|---|
| JP | 2005-032933 A | 2/2005 |
| JP | 2018-018587 A | 2/2018 |
| WO | 2017/115758 A1 | 7/2017 |

OTHER PUBLICATIONS

Taiwanese Office Action (Application No. 112105666) dated May 11, 2023 (6 pages).

(Continued)

*Primary Examiner* — Alain Chau
(74) *Attorney, Agent, or Firm* — Muncy, Geissler, Olds & Lowe, P.C.

(57) ABSTRACT

A ceramic heater includes: a ceramic plate having a wafer placement surface on a surface thereof; zone heaters embedded in the ceramic plate so as to correspond to zones defined by dividing the surface of the ceramic plate into multiple sections; terminals connected to ends of the zone heaters via internal wires of the ceramic plate; terminal collection regions in which the plurality of terminals are collectively arranged; and non-terminal regions in which no terminal is arranged. The ceramic heater includes, as the zone heaters, a terminal-collection-region zone heater provided in a zone corresponding to the terminal collection regions, and a non-terminal regions zone heater provided in a zone corresponding to the non-terminal regions.

4 Claims, 6 Drawing Sheets

(51) Int. Cl.
*H05B 3/26* (2006.01)
*H05B 3/28* (2006.01)

(58) Field of Classification Search
CPC ........ H05B 2203/005; H05B 2203/007; H05B 3/0019
See application file for complete search history.

(56) References Cited

U.S. PATENT DOCUMENTS

| | | | | |
|---|---|---|---|---|
| 7,417,206 | B2 * | 8/2008 | Nakamura | H10P 72/0432 219/544 |
| 8,168,050 | B2 * | 5/2012 | Lu | H05B 3/143 438/758 |
| 10,256,105 | B2 * | 4/2019 | Takebayashi | H10P 50/242 |
| 11,956,863 | B2 * | 4/2024 | Unno | C23C 16/46 |
| 12,020,956 | B2 * | 6/2024 | Lal | H05B 3/283 |
| 12,063,719 | B2 * | 8/2024 | Suzuki | H05B 3/03 |
| 12,150,219 | B2 * | 11/2024 | Nobori | H05B 3/283 |
| 2004/0016746 | A1 * | 1/2004 | Ito | H05B 1/0233 118/725 |
| 2004/0112888 | A1 * | 6/2004 | Tachikawa | H05B 3/143 219/468.1 |
| 2004/0117977 | A1 * | 6/2004 | Hiramatsu | H01L 21/68757 257/524 |
| 2004/0206747 | A1 * | 10/2004 | Ito | H01L 21/67109 219/541 |
| 2008/0029195 | A1 * | 2/2008 | Lu | H05B 3/143 156/1 |
| 2016/0307787 | A1 | 10/2016 | Uemura et al. | |
| 2017/0345668 | A1 | 11/2017 | Takebayashi et al. | |
| 2018/0096868 | A1 * | 4/2018 | Kitabayashi | H01L 21/67103 |
| 2019/0355556 | A1 | 11/2019 | Takahashi | |
| 2019/0385871 | A1 * | 12/2019 | Takebayashi | H01L 21/02 |
| 2020/0350186 | A1 * | 11/2020 | Lal | H01L 21/67103 |
| 2020/0396801 | A1 * | 12/2020 | Unno | H05B 3/265 |
| 2021/0007183 | A1 * | 1/2021 | Miwa | H05B 3/283 |
| 2021/0136875 | A1 * | 5/2021 | Suzuki | H05B 3/283 |
| 2021/0242048 | A1 * | 8/2021 | Ishikawa | H01L 21/6831 |

OTHER PUBLICATIONS

Japanese Office Action (Application No. 2022-032565) dated Feb. 6, 2024 (with English translation) (7 pages).

* cited by examiner

CERAMIC HEATER

BACKGROUND OF THE INVENTION

1. Field of the Invention

The present invention relates to a ceramic heater.

2. Description of the Related Art

In a known ceramic heater in the related art, a ceramic base is divided into multiple zones, and each zone is embedded with a heating element. For example, PTL 1 discloses a ceramic heater in which terminals for supplying power to heating elements are collectively arranged in a terminal collection region.

CITATION LIST

Patent Literature

PTL 1: WO2017/115758 A1

SUMMARY OF THE INVENTION

Some ceramic heaters like this have employed a layout in which a terminal collection region and a non-terminal region are provided adjacent to each other. In that case, there has been a problem in that, even when it is intended to control the temperature with a single zone heater by defining the terminal collection region and the non-terminal region in the same zone, it is difficult to make the temperature of a wafer placement surface uniform because, unlike the non-terminal region, multiple terminals are provided in the terminal collection region.

The present invention has been made to solve the above-described problem, and the main purpose thereof is to make it easy to achieve uniform temperature over the entire wafer placement surface.

A ceramic heater of the present invention includes: a ceramic plate having a wafer placement surface on a surface thereof; zone heaters embedded in the ceramic plate so as to correspond to zones defined by dividing the surface of the ceramic plate into multiple sections; terminals connected to ends of the zone heaters via internal wires of the ceramic plate; a terminal collection region that is provided in the ceramic plate and in which the plurality of terminals are collectively arranged; and a non-terminal region that is provided in the ceramic plate and in which no terminal is arranged. The zone heaters include a terminal-collection-region zone heater provided in a zone corresponding to the terminal collection region, and a non-terminal-region zone heater provided in a zone corresponding to the non-terminal region.

This ceramic heater includes, as zone heaters, a terminal-collection-region zone heater provided in the zone corresponding to the terminal collection region, and a non-terminal-region zone heater provided in the zone corresponding to the non-terminal region. Therefore, it is possible to independently control the temperatures of the terminal-collection-region zone heater and the non-terminal-region zone heater. Accordingly, it is easy to achieve uniform temperature over the entire wafer placement surface.

In the ceramic heater of the present invention, the plurality of terminals provided in the terminal collection region may be arranged in an arc along a circle concentric with the ceramic plate or linearly in a tangential direction of a circle concentric with the ceramic plate. This layout is often preferred.

In the ceramic heater of the present invention, the terminal collection region may be provided so as to be located on the outermost circumference of the ceramic plate. This allows a large number of terminals to be arranged in the terminal collection region. This is because the outermost circumference of the ceramic plate has a large circumference.

The ceramic heater of the present invention may be used in a state in which a cooling plate is joined to a lower surface of the ceramic plate. Because the magnitude of heat extraction by the cooling plate differs between the terminal collection region and the non-terminal region adjacent thereto, it is highly necessary to make the temperature of the wafer uniform.

DETAILED DESCRIPTION OF THE INVENTION

Figure 1:
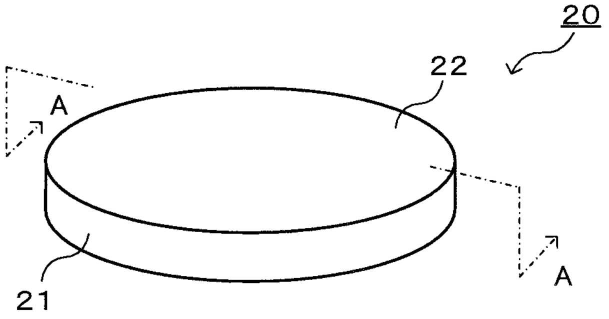
FIG. 1 is a perspective view of a ceramic heater 20.
Figure 2:
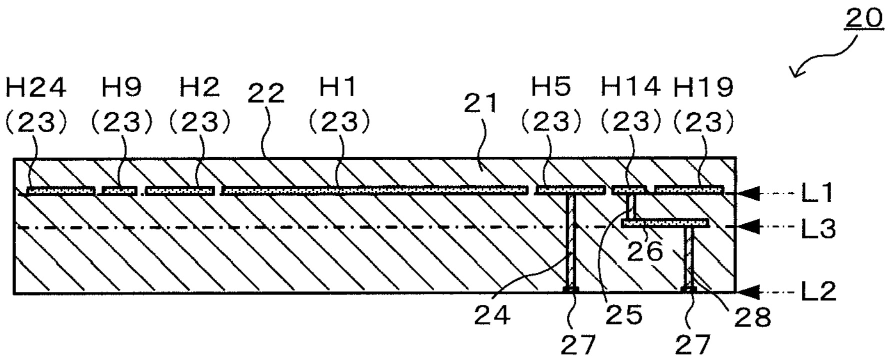
FIG. 2 is a cross section taken along line A-A in FIG. 1.
Figure 3:
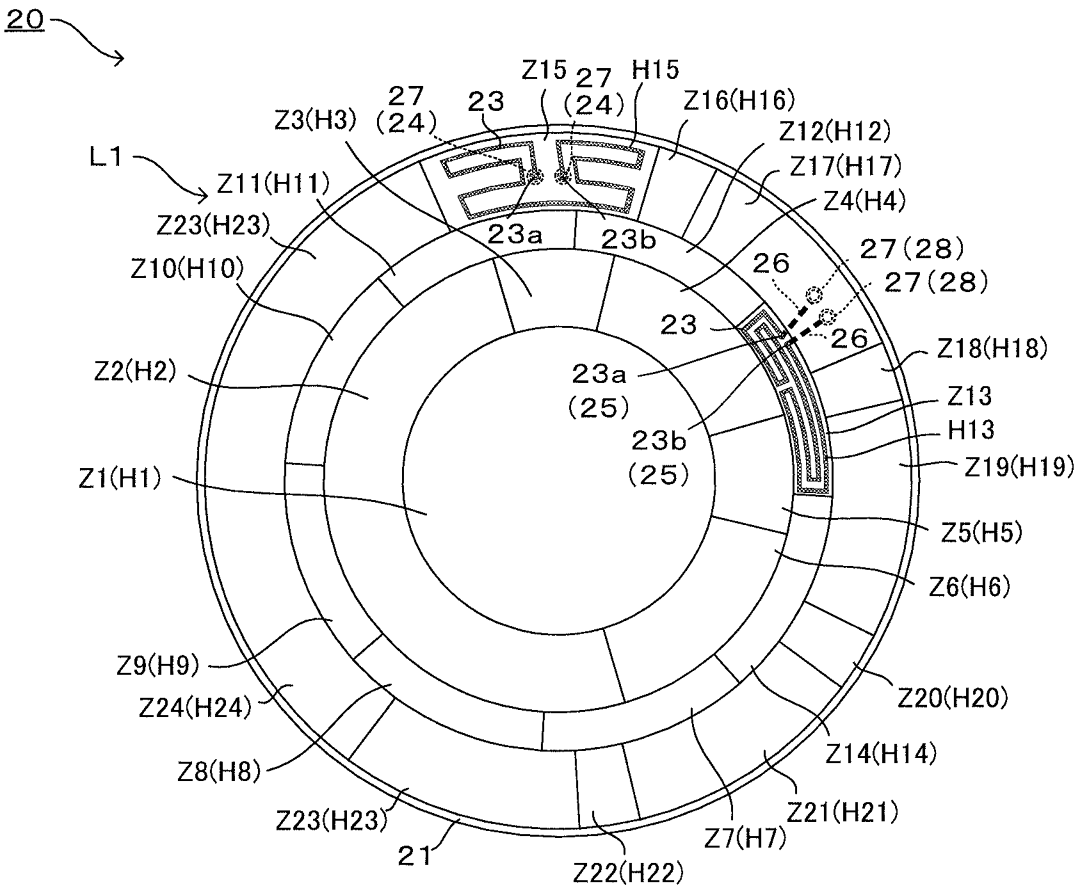
FIG. 3 is an explanatory diagram of a heater layer L1 viewed from above.
Figure 4:
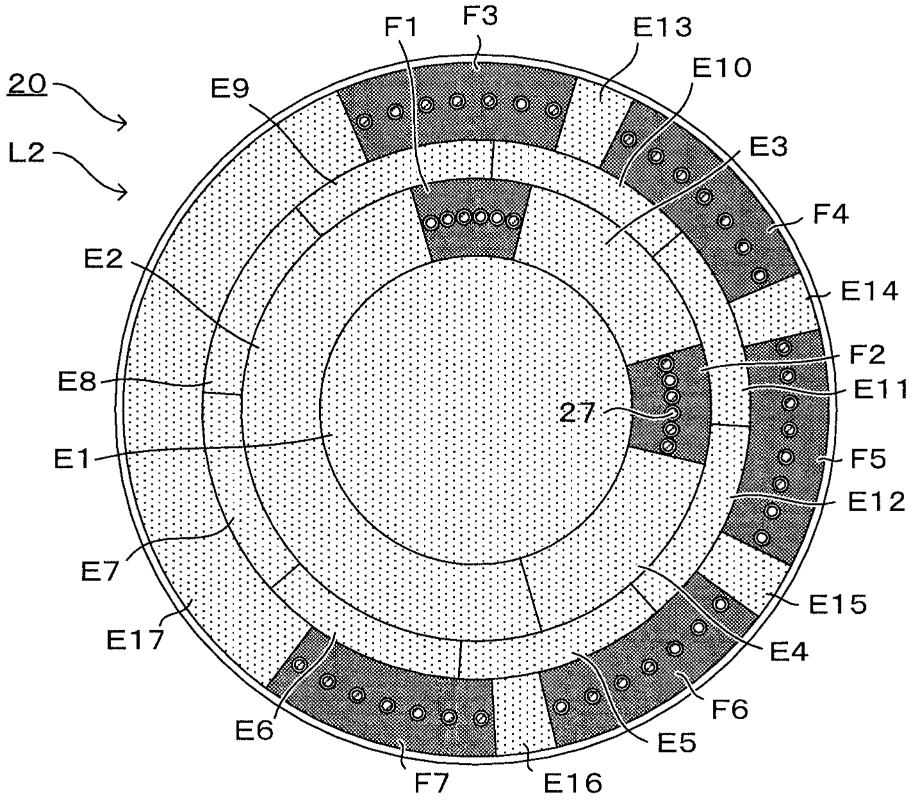
FIG. 4 is an explanatory diagram of a terminal layer L2 viewed from above.

FIG. 1 is a perspective view of a ceramic heater 20, FIG. 2 is a cross section taken along line A-A in FIG. 1, FIG. 3 is an explanatory diagram of a heater layer L1 viewed from above, and FIG. 4 is an explanatory diagram of a terminal layer L2 viewed from above.

The ceramic heater 20 is used to perform various processing on a wafer. The ceramic heater 20 is formed by providing a heater layer L1, a terminal layer L2, and a jumper layer L3 in a disc-shaped ceramic plate 21.

As shown in FIG. 2, the heater layer L1 is a layer accommodated in the ceramic plate 21. As shown in FIG. 3, the heater layer L1 is provided with zone heaters H1 to H24. The zone heaters H1 to H24 are provided so as to correspond to zones Z1 to Z24 defined by dividing a wafer placement surface 22 into multiple (herein, 24) sections. Note that, in the description below, when the zone heaters H1 to H24 are not distinguished from one another, they are referred to as zone heaters Hn, and when the zones Z1 to Z24 are not distinguished from one another, they are referred to as zones Zn. The letter n represents any one of integers 1 to 24. A zone heater Hn is formed by wiring a resistance heating element 23 in a one-stroke pattern from one end 23*a* to the other end 23*b* over the entirety of the corresponding zone Zn. The resistance heating element 23 is formed of, for example, molybdenum, tungsten, a molybdenum alloy, a tungsten alloy, copper, or titanium. The zone heater Hn is heated when power is supplied to the ends 23*a* and 23*b* of the resistance heating element 23. An example wiring pattern of the resistance heating element 23 of the zone heater H13 and an example wiring pattern of the resistance heating element 23 of the zone heater H15 are shown in FIG. 3.

The zone Z1 is a circular region that is concentric with the ceramic plate 21 and that has a smaller diameter than the ceramic plate 21. The zones Z2 to Z6 adjoin the outer circumferential edge of the zone Z1. More specifically, the zones Z2 to Z6 are defined by dividing a first annular zone, whose outside diameter is greater than the diameter of the zone Z1 and whose inside diameter is equal to the diameter of the zone Z1, into multiple sections in the radial direction of the ceramic plate 21. The zones Z7 to Z14 adjoin the outer circumferential edge of the first annular zone. More specifically, the zones Z7 to Z14 are defined by dividing a second annular zone, whose outside diameter is greater than the outside diameter of the first annular zone and whose inside diameter is equal to the outside diameter of the first annular zone, into multiple sections in the radial direction of the ceramic plate 21. The zones Z15 to Z24 adjoin the outer circumferential edge of the second annular zone. More specifically, the zones Z15 to Z24 are defined by dividing a third annular zone (outermost annular zone), whose outside diameter is greater than the outside diameter of the second annular zone and whose inside diameter is equal to the outside diameter of the second annular zone, into multiple sections in the radial direction of the ceramic plate 21.

As shown in FIG. 2, the terminal layer L2 is the lower surface of the ceramic plate 21. As shown in FIG. 4, the terminal layer L2 is provided with terminal collection regions F1 to F7 and non-terminal regions E1 to E17. The terminal layer L2 is virtually divided into regions corresponding to the zones Z1 to Z24. The regions corresponding to the zones Z3, Z5, Z15, Z17, Z19, Z21, and Z23 are the terminal collection regions F1 to F7, and the regions corresponding to the zones Z1, Z2, Z4, Z6 to Z14, Z16, Z18, Z20, Z22, and Z24 are the non-terminal regions E1 to E17.

In each of the terminal collection regions F1 to F7, multiple (for example, at least five) terminals 27 are collectively arranged. The distance between the multiple terminals 27 collectively arranged in the terminal collection regions F1 to F7 is desirably 20 mm or less, and more desirably, 10 mm or less. There are no terminals 27 arranged in the non-terminal regions E1 to E17. In the terminal collection regions F1 to F7, multiple terminals 27 are arranged in arcs along circles concentric with the ceramic plate 21. The terminal collection regions F3 to F7 and the non-terminal regions E13 to E17 are provided so as to be located on the outermost circumference of the ceramic plate 21. Each of the terminal collection regions F1 to F7 is adjoined by any of the non-terminal regions E1 to E17.

Herein, the zone heater H3 is a terminal-collection-region zone heater provided in the zone Z3 corresponding to the terminal collection region F1. The zone heaters H5, H15, H17, H19, H21, and H23 are also the terminal-collection-region zone heaters that are provided in the zones Z5, Z15, Z17, Z19, Z21, and Z23 corresponding to the terminal collection regions F2 to F7. The other zone heaters H1, H2, H4, H6 to H14, H16, H18, H20, H22, and H24 are non-terminal-region zone heaters.

As shown in FIG. 2, the jumper layer L3 is provided inside the ceramic plate 21, between the heater layer L1 and the terminal layer L2. The jumper layer L3 is provided with multiple jumpers 26. The ends 23*a* and 23*b* of the resistance heating elements 23 constituting the non-terminal-region zone heaters H1, H2, H4, H6 to H14, H16, H18, H20, H22, and H24 are each connected to jumpers 26 through intermediate vias 25 extending in the vertical direction of the ceramic plate 21, are led to immediately above the terminals 27 in any of the terminal collection regions F1 to F7 by the jumpers 26, and are connected from the jumpers 26 to the terminals 27 through terminal connecting vias 28 (for example, see the non-terminal-region zone heater H13 in FIG. 3). Meanwhile, the ends 23*a* and 23*b* of the resistance heating elements 23 constituting the terminal-collection-region zone heaters H3, H5, H15, H17, H19, H21, and H23 are each connected to terminals 27 in the terminal collection regions immediately therebelow through terminal connecting vias 24 extending in the vertical direction of the ceramic plate 21 (for example, see the terminal-collection-region zone heater H15 in FIG. 3). Note that the terminal connecting vias 24 and 28, the intermediate vias 25, and the jumpers 26 correspond to internal wires of the present invention.

The ceramic heater 20 like this can be produced by, for example, a production method including a process of hot-press firing a molded body formed of ceramic powder. The molded body in this case may be produced by stacking tape molded bodies in multiple layers, by mold casting, or by pressing ceramic powder into a solid body. Alternatively, the molded body may be produced by combining a method in which the ceramic powder is pressed into a solid body, a method in which tape molded bodies are stacked in multiple layers, and mold casting.

Figure 5:
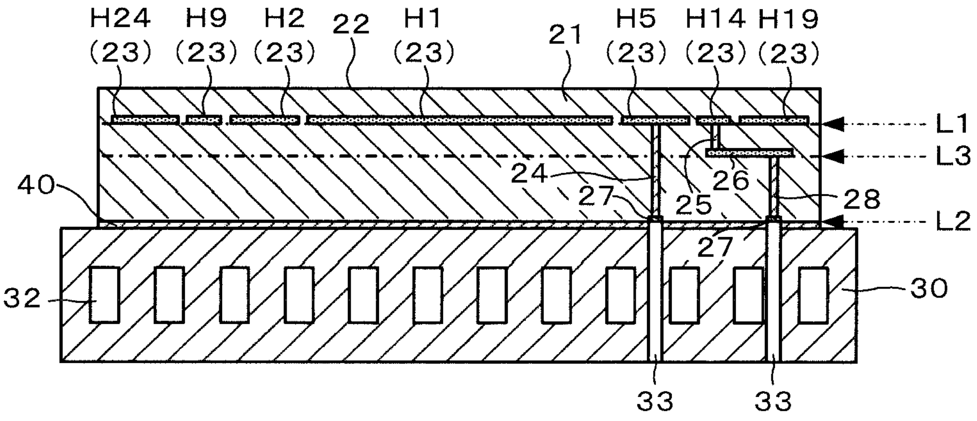
FIG. 5 is an explanatory diagram showing an example use of the ceramic heater 20.

Next, an example use of the ceramic heater 20 will be described with reference to FIG. 5. FIG. 5 is an explanatory diagram showing an example use of the ceramic heater 20. FIG. 5 shows the same cross section as in FIG. 2. First, a cooling plate 30 having a cooling flow path 32, through which coolant passes, is joined to the lower surface of the ceramic heater 20 with a joining layer 40 therebetween. The refrigerant flow path 32 is connected to a refrigerant supply path (not shown) and a refrigerant discharging path. The refrigerant discharged from the refrigerant discharging path is returned to the refrigerant supply path after the temperature thereof is adjusted. The cooling plate 30 may be made of, for example, a metal matrix composite material (or a metal matrix composite (MMC)) or a metal material, such as aluminum, titanium, molybdenum, tungsten, or an alloy thereof. The joining layer 40 may be made of, for example, an Al—Mg metal material, an Al—Si—Mg metal material, a silicone resin, an acrylic resin, or an epoxy resin. The cooling plate 30 is provided with, at positions facing the terminal collection regions F1 to F7 of the ceramic heater 20, slits 33 (through-holes) that are large enough to allow the multiple terminals 27 disposed in the terminal collection regions F1 to F7 to be exposed outside. A mounting connector is inserted into each slit 33. By doing so, the mounting connectors are connected to the multiple terminals 27 in the terminal collection regions F1 to F7 of the ceramic heater 20. Flat cables are connected to the mounting connectors, and the flat cables extend to the outside through the slits 33 in the cooling plate 30. With this configuration, it is possible to adjust the voltages and currents to be supplied to the respective zone heaters Hn through the mounting connectors, and thus, to control the temperatures of the respective zones Zn.

The ceramic heater 20 described in detail above includes, as zone heaters, terminal-collection-region zone heaters that are provided in the zones corresponding to the terminal collection regions F1 to F7, and non-terminal-region zone heaters that are provided in the zones corresponding to the non-terminal regions E1 to E17. Typically, in the wafer placement surface 22, the zones corresponding to the terminal collection regions F1 to F7 tend to become temperature singular points. This is because the situation of heat extraction in the terminal collection regions F1 to F7 is significantly different from that in the non-terminal regions E1 to E17 adjacent thereto. In this embodiment, the temperatures of the terminal-collection-region zone heaters and the non-terminal-region zone heaters can be independently controlled. Accordingly, it is easy to achieve uniform temperature over the entire wafer placement surface 22.

Furthermore, in the ceramic heater 20, the multiple terminals 27 provided in the terminal collection regions F1 to F7 are arranged in arcs along circles concentric with the ceramic plate 21. This layout is often preferred.

In addition, in the ceramic heater 20, the terminal collection regions F3 to F7 are provided so as to be located on the outermost circumference of the ceramic plate 21. Hence, it is possible to arrange a large number of terminals 27 in the terminal collection regions F3 to F7. This is because the outermost circumference of the ceramic plate 21 has a large circumference.

In addition, the ceramic heater 20 is used in a state in which the cooling plate 30 is joined to the lower surface of the ceramic plate 21. Because the magnitude of heat extraction by the cooling plate 30 in the terminal collection regions F1 to F7 is different from that in the non-terminal regions E1 to E17 adjacent thereto, it is highly necessary to make the temperature of the wafer W uniform.

It is needless to say that the present invention is not limited to the above-described embodiment and can be implemented in various forms insofar as those forms fall within the technical scope of the present invention.

Figure 6:
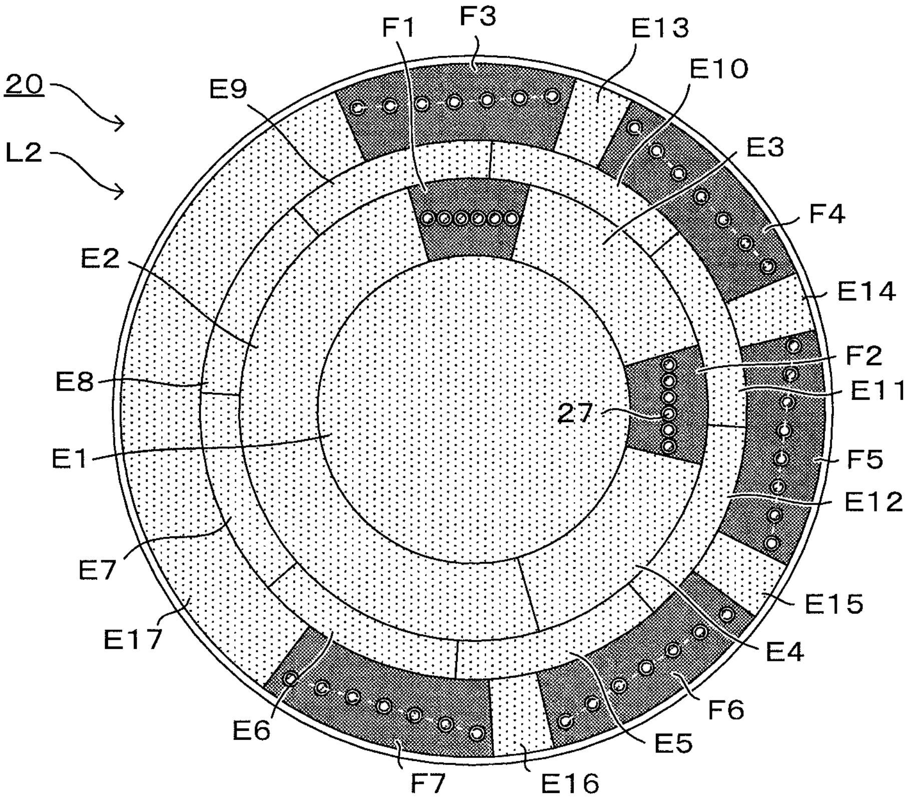
FIG. 6 is an explanatory diagram showing another example of the terminal layer L2.

For example, in the above-described embodiment, although the multiple terminals 27 provided in the terminal collection regions F1 to F7 are arranged in arcs along circles concentric with the ceramic plate 21, the arrangement is not limited thereto. For example, in the above-described embodiment, the multiple terminals 27 provided in the terminal collection regions F1 to F7 may be arranged linearly in tangential directions of circles concentric with the ceramic plate 21. FIG. 6 shows the arrangement of the terminals 27 in the terminal collection regions F1 to F7 in this case. FIG. 6 is an explanatory diagram of the terminal layer L2 viewed from above. In FIG. 6, the same components as those in the above-described embodiment are denoted by the same reference signs.

Figure 7:
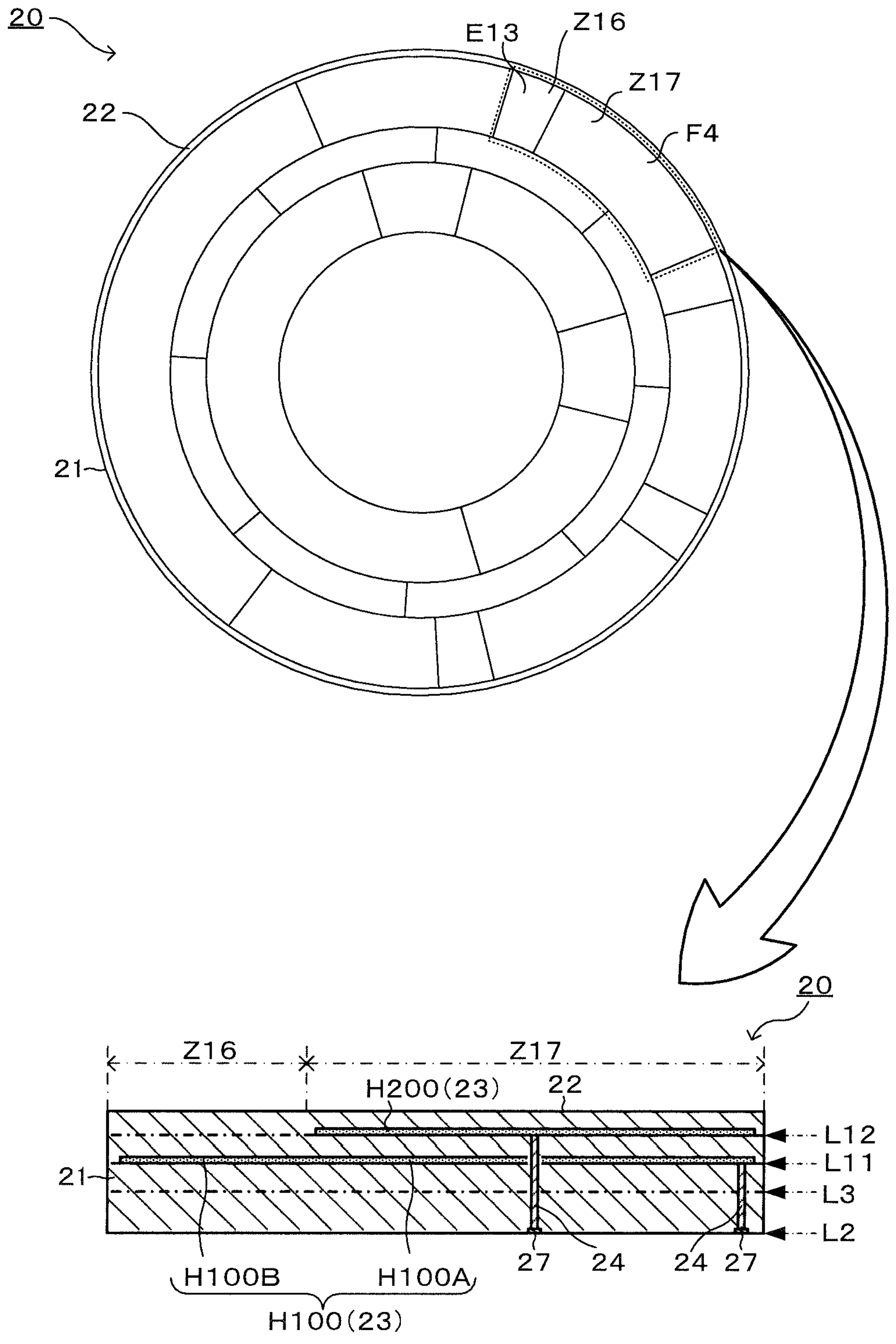
FIG. 7 is an explanatory diagram showing another example of a zone heater.

Although each zone is provided with one zone heater in the above-described embodiment, the configuration is not limited thereto. For example, as shown in FIG. 7, it is possible to provide a first heater H100 for both a zone corresponding to the terminal collection region and a zone corresponding to the non-terminal region, and a second heater H200 for the zone corresponding to the terminal collection region. FIG. 7 shows an example arrangement of the first heater H100 and the second heater H200 in the zone Z16 and the zone Z17. The first heater H100 is formed by wiring a resistance heating element 23 in a one-stroke pattern from one end 23*a* to the other end 23*b* over the entirety of the zone Z16 and the zone Z17. The first heater H100 is provided in the first heater layer L11. The first heater H100 includes a terminal-collection-region corresponding part H100A located in the zone Z17 (i.e., the zone corresponding to the terminal collection region F4) and a non-terminal-region corresponding part H100B located in the zone Z16 (i.e., the zone corresponding to the non-terminal regions E13). The second heater H200 is formed by wiring a resistance heating element 23 in a one-stroke pattern from one end 23*a* to the other end 23*b* over the entirety of the zone Z17. The second heater H200 is provided in the second heater layer L12. The second heater layer L12 is a layer between the wafer placement surface 22 and the first heater layer L11. Herein, the terminal-collection-region corresponding part H100A of the first heater H100 and the second heater H200 correspond to the terminal-collection-region zone heater of the present invention, and the non-terminal-region corresponding part H100B of the first heater H100 corresponds to the non-terminal-region zone heater of the present invention. In FIG. 7, the same components as those in the above-described embodiment are denoted by the same reference signs.

Although the terminal collection regions F1 and F2 are provided in areas other than the outermost circumference of the ceramic plate 21 in the above-described embodiment, the configuration is not limited thereto. For example, in the above-described embodiment, the terminal collection regions F1 to F7 may be provided on the outermost circumference of the ceramic plate 21.

Although there is only one heater layer L1 in the above-described embodiment, the configuration is not limited thereto. For example, in the above-described embodiment, multiple heater layers may be provided.

Although the mounting connectors are connected to the terminal collection regions F1 to F7 in the above-described embodiment, the configuration is not limited thereto. For example, a flexible printed circuit board (FPC) may be joined instead of the mounting connectors. Joining may be achieved by using, for example, solder, metal brazing material, or conductive paste.

Although the ceramic heater 20 has the terminals 27 that are twice the number of the zone heaters Hn in the above-described embodiment, the configuration is not limited thereto. For example, in the above-described embodiment, the ceramic heater 20 may have the terminals 27 that are less than twice the number of the zone heaters. For example, the number of the terminals may be reduced by connecting one-side ends of the multiple zone heaters to a common ground terminal.

In the above-described embodiment, a seal band may be formed along the outer edge of the wafer placement surface 22, and multiple small projections may be formed over the entire surface, so that the wafer W is supported by the top surface of the seal band and the top surfaces of the multiple small projections.

In the above-described embodiment, the ceramic heater 20 may have multiple holes penetrating through the ceramic heater 20 in the vertical direction. Such holes include multiple gas holes provided in the wafer placement surface 22 and lift pin holes through which lift pins for moving the wafer W up and down with respect to the wafer placement surface 22 are inserted. The multiple gas holes are provided at appropriate positions in plan view of the wafer placement surface 22. Heat conducting gas, such as He gas, is supplied to the gas holes. Typically, the gas holes are provided at portions, in the wafer placement surface 22 provided with the seal band and the small projections, where the seal band or the small projections are not provided. When the heat conducting gas is supplied to the gas holes, a space behind the wafer W placed on the wafer placement surface 22 is filled with the heat conducting gas. The multiple lift pin holes are provided at equal intervals along a circle concentric with the wafer placement surface 22 in plan view of the wafer placement surface 22.

In the above-described embodiment, the ceramic heater 20 may accommodate an electrostatic electrode, and/or an RF electrode for generating plasma.

In the above-described embodiment, it is possible to omit the terminals 27 and allow the lower ends of the terminal connecting vias 24 and 28 to be exposed on the lower surface of the ceramic plate 21.

The present application claims priority from Japanese Patent Application No. 2022-032565, filed on Mar. 3, 2022, the entire contents of which are incorporated herein by reference.

What is claimed is:

1. A ceramic heater comprising:

a ceramic plate having a wafer placement surface on a surface thereof;

zone heaters embedded in the ceramic plate so as to correspond to zones defined by dividing the surface of the ceramic plate into multiple sections;

terminals connected to ends of the zone heaters via internal wires of the ceramic plate;

a terminal collection region that is provided in the ceramic plate and in which the plurality of terminals are collectively arranged; and a non-terminal region that is provided in the ceramic plate and in which no terminal is arranged, wherein the zone heaters include a terminal-collection-region zone heater provided in a zone corresponding to the terminal collection region, and a non-terminal-region zone heater provided in a zone corresponding to the non-terminal region;

wherein the ceramic plate is circular in a plan view;

wherein the plurality of zones include a circular region zone concentric with the ceramic plate, and annular divided zones formed by dividing an annular band around the circular region zone into a plurality of sections along a radial direction of the ceramic plate;

wherein the zone corresponding to the terminal collection region is selected from the plurality of annular divided zones; and wherein the plurality of terminals arranged in the terminal collection region are provided over an arc of the annular divided zone corresponding to the terminal collection region from one end to the other end of the zone.

2. The ceramic heater according to claim 1, wherein the plurality of terminals provided in the terminal collection region are arranged in an arc along a circle concentric with the ceramic plate or linearly in a tangential direction of a circle concentric with the ceramic plate.

3. The ceramic heater according to claim 1, wherein the terminal collection region is provided so as to be located on the outermost circumference of the ceramic plate.

4. The ceramic heater according to claim 1, further including a cooling plate joined to a lower surface of the ceramic plate.

* * * * *